Figure 1:
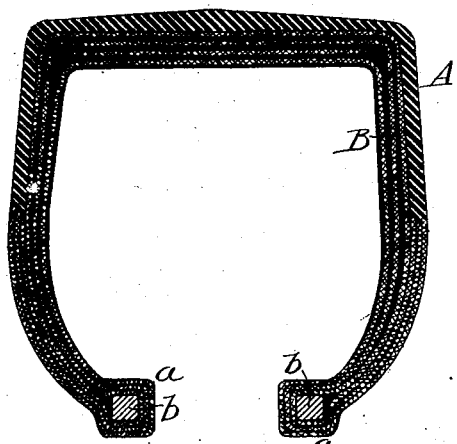

No. 754,648. PATENTED MAR. 15, 1904.
H. G. FISKE.
TIRE.
APPLICATION FILED JULY 1, 1899.
NO MODEL. 2 SHEETS—SHEET 1.

WITNESSES
James F. Duhamel.
F. Horkimer

INVENTOR
Henry G. Fiske
BY
Frankland Jannus
ATTORNEY

No. 754,648. PATENTED MAR. 15, 1904.
H. G. FISKE.
TIRE.
APPLICATION FILED JULY 1, 1899.
NO MODEL. 2 SHEETS—SHEET 2.
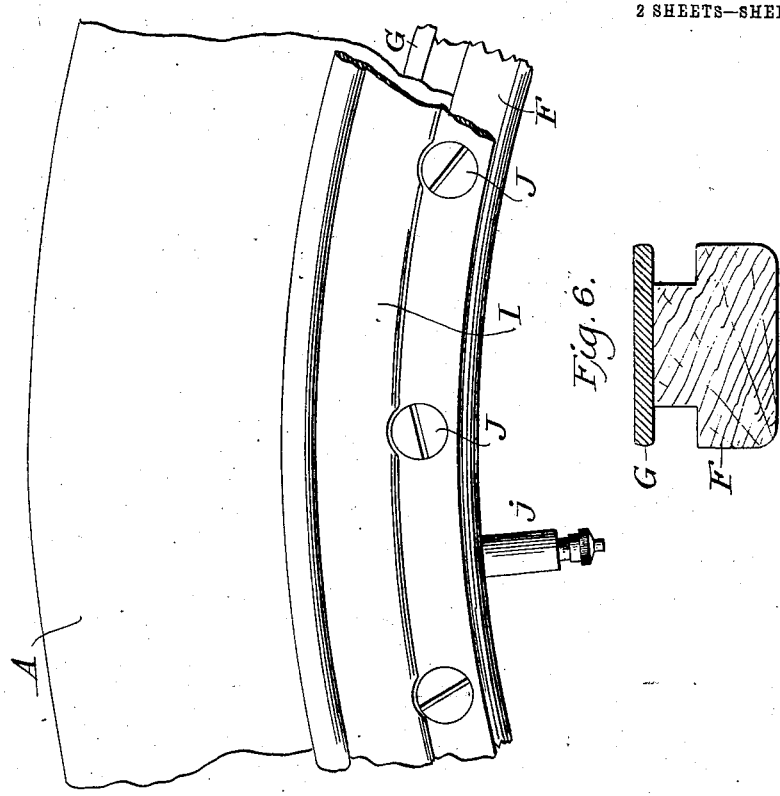
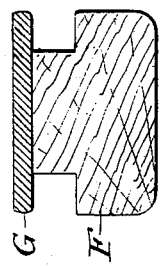
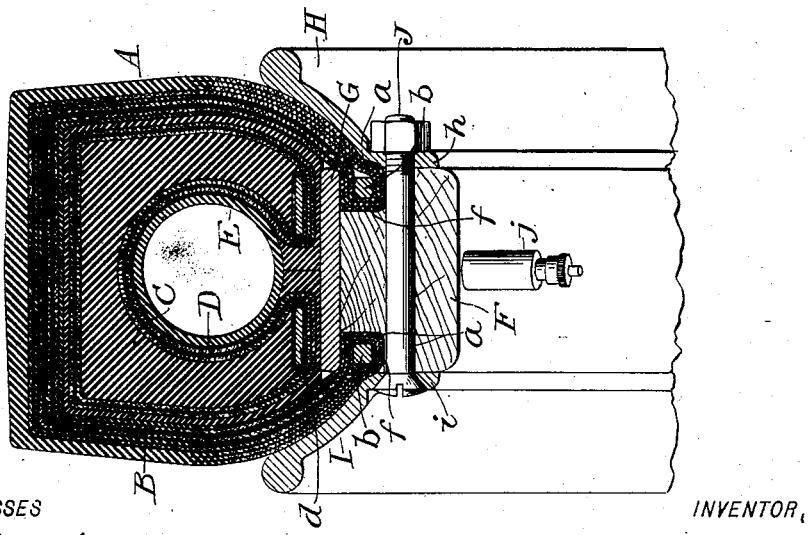
WITNESSES
James F. Duhamel
F. Horkimer
INVENTOR,
Henry G. Fiske,
BY
Frankland Jannus
ATTORNEY No. 754,648.

Patented March 15, 1904.

UNITED STATES PATENT OFFICE.

HENRY G. FISKE, OF NEW YORK, N. Y., ASSIGNOR, BY MESNE ASSIGNMENTS, TO MORTON TRUST COMPANY, TRUSTEE, A CORPORATION OF NEW YORK.

TIRE.

SPECIFICATION forming part of Letters Patent No. 754,648, dated March 15, 1904.

Application filed July 1, 1899. Serial No. 722,528. (No model.)

*To all whom it may concern:*

Be it known that I, HENRY G. FISKE, a citizen of the United States of America, and a resident of the city of New York, county of New York, and State of New York, have invented certain new and useful Improvements in Tires, of which the following is a specification.

My invention relates to improvements in pneumatic tires, (type R.)

The invention comprises a tire possessing great strength and durability, together with a large degree of elasticity.

The invention is embodied in a tire consisting of an outer casing composed principally of layers of fabric having rubber between them to cement and hold them together. Within the outer casing is fitted an inner detachable casing which is strongly reinforced both upon its exterior and its interior with several layers of fabric, there being also a filling of resilient material, as rubber. Within the inner casing is located an air-tight inflatable tube of relatively small diameter, so that the tire possesses two sources of elasticity— namely, the compressibility of the body of rubber contained in the inner casing and the compressibility of the air under pressure in the inner tube.

My improved tire is applied to a wheel having, preferably, a wooden felly formed with recesses in its outer edge for the reception of the edges of the outer casing, which edges are enlarged and also strengthened by bands of fabric and rubber or by a suitable cord, which increases the size of the edges of said casing so that they fill the notches and are held securely upon the felly by clamp-plates while in position within the notches formed for their reception. Upon the periphery of the felly is secured, preferably in the usual way by shrinkage thereon, a metallic band of substantially the same width as the air-pressure of the felly. Upon the outer surface of this band rest the edges of the inner casing, which are also reinforced by endless metallic bands. The inner tube is placed within the inner casing. Laterally-detachable metallic flanges are fitted against the sides of the felly, and their outer portions flare so as to form a trough or channel for the reception of the tire; but at the same time their lower portions engage the outer part of the edges of the outer casing in a manner to confine the same within the notches of the felly, and so effectually prevent their displacement until one or both of the said edges are released by removal of the flanges, when they can be readily withdrawn.

Figure 2:
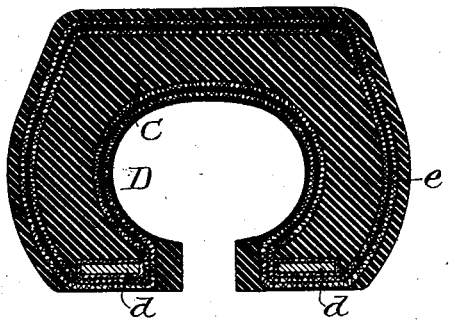
Figure 3:
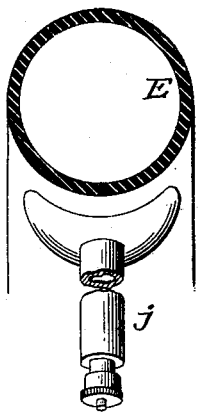

In the accompanying drawings, Figure 1 is a transverse sectional elevation of the outer casing. Fig. 2 is a similar view showing the inner casing separately. Fig. 3 is a sectional view of the inner tube. Fig. 4 is a transverse sectional elevation showing the rim and tire complete. Fig. 5 is a side elevation of a portion of the tire as shown in Fig. 4. Fig. 6 is sectional elevation of the felly F and band G.

In said drawings, A is the outer casing, which has reinforced lower edges *a a*, within which are embedded filling-bands *b*, preferably of fabric and rubber.

B indicates a number of layers of fabric which are cemented together by rubber and which form the said casing, the same being covered with an exterior layer of rubber, and, as indicated, the outer or tread portion of the said casing is formed to produce a substantially flat periphery or tread.

Fig. 2 shows what I have called the "inner" casing, which comprises a filling C, of rubber, conforming to the interior of the outer casing A—that is, having also a substantially flat tread portion and formed with a central substantially cylindrical chamber D for the reception of the inner air-tube E. By having a chamber D formed entirely within the body of the filling-cushion C an air-tube E, which is the most delicate part of the whole tire, is thoroughly protected. The inner casing is also separated on its lower under side and provided with reinforced edges, in which latter are embedded endless metallic bands *d d*. These endless metallic bands serve not only to keep the tire in proper position upon the peripheral flange G, hereinafter described, but through the medium of the retaining-plates H I force the inner edges of the cushion into close contact, thus making the chamber D practically air-tight, so that for all purposes and intents the chamber of this cushion is a supplemental air-tube acting as a reinforce for the main air-tube E. Several layers $e$ of reinforcing fabric are secured to the exterior of the said inner casing, also extending about and forming a pressure-resisting lining for the chamber D of said inner casing, within which the air-tube E is contained.

F is a felly, preferably of wood, the upper portion of which is cut away upon each side to form notches $f$ on each side, and these notches are of such dimension as to receive and contain the reinforced edges $a$ of the outer casing A.

G is a metallic band which is secured upon the periphery of the felly A, and being of the normal width of the felly its edges overlap the notches $f$, forming part of the means for holding the edges of the outer casing therein.

H I are metallic flanges which flare outwardly and sustain the sides and form a seat for the portion of the tire which projects beyond the felly. The flanges are provided with parallel lower or inner portions which rest against the sides of the felly F, being drawn into contact therewith laterally by bolts J, which pass through the said flanges and the felly. The parallel portions $h$ $i$ of the said flanges H I extend above the lower edges of the notches $f$ and act to press against the outer portion of the edges $a$ $a$ of the outer casing to force and hold the same firmly in position in the aforesaid notches, and the outwardly-flaring portions of the flanges are made to closely conform to and support the lower portion of the tire. Prior to the placing of the outer casing A in position the inner casing is inserted therein and the inner tube placed within the inner casing. The bands $d$ in the edges of the inner casing are of such diameter as to fit snugly upon the metallic band G of the felly, and consequently when the said side flanges H I are drawn together, so as to force the edges $a$ $a$ of the outer casing into their notches $f$, the said bands $d$ of the inner casing will at the same time be forced into position upon the band G, where they have an ample and secure bearing. An inlet-valve $j$ is connected with the inner tube in the usual manner and through which it is charged with compressed air.

Without limiting myself to the exact details of construction herein set forth, what I claim is—

1. A pneumatic tire comprising an exterior portion with reinforced edges including fabric constituting a loop, and a solid member in said loop and an inflatable air-tube entirely incased within the tire, the material between said air-tube and the exterior of the tire being so disposed as to support a flat tread portion, and interiorly affording a normally circular cavity for said air-tube, a felly and flanges engaging the edges of said outer portion and flaring to support the side walls of the tire near their base.

2. A pneumatic tire comprising an exterior portion with enlarged edges including fabric and an inextensible member and an inflatable air-tube entirely incased within the tire, and material between said air-tube and exterior of the tire so disposed as to support a flat tread portion approximating in width the diameter of the tire, and so disposed as to support the inner tube in normally circular position, a felly, and lateral detachable flanges secured to said felly and engaging the edges of said outer portion.

3. A pneumatic tire comprising an exterior portion with enlarged edges including fabric and an inextensible member and interiorly comprising a single inflatable air-tight tubular portion entirely incased within the tire, the material between said tubular portion and the exterior of the tire being so disposed as to support a flat tread portion greater in width than the diameter of the air-tight tubular portion and so disposed as to support said air-tight tubular portion in circular position, a felly, laterally-detachable flanges secured to said felly and engaging the edges of said outer portion.

4. A pneumatic tire comprising an exterior with reinforced air-tube including looped fabric entirely incased within the tire, the material between said air-tube and the interior of the tire containing reinforcing material so disposed as to support the flat tread portion presented by the conformity of the exterior of the tire and support said air-tube normally circular, a felly supporting the reinforced edges of the tire, flanges engaging the edges of said outer portion, and laterally supporting the tire above the reinforced edges, said flanges laterally detachable from the felly.

5. A pneumatic tire comprising an exterior portion of the reinforced edges embodying looped fabric, an inflatable air-tube entirely incased within the tire, material between said air-tube and the exterior of the tire-embodying fabric or other strain-resisting material disposed to restrain said air-tube in a circular configuration, a felly supporting the reinforced edges of the tire, flanges engaging the edges of said outer portion and laterally supporting the tire above the reinforced edges, said flanges laterally detachable from the felly.

6. A pneumatic cushion-tire comprising a casing having a flat tread of substantially uniform thickness, a detachable inner casing also having a flat tread portion and conforming to the casing and formed with an interior air-chamber, and an air-tube wholly incased in and supported by the detachable inner casing.

7. A pneumatic cushion-tire comprising an exterior reinforced casing having reinforced edges, an inner detachable elastic cushion-casing provided with an endless band in each edge, an air-tube adapted to be placed within and be entirely surrounded by the inner casing, and a suitable rim.

8. In combination, a felly having notches in its sides and a metallic band upon its periphery, said band overlapping the notches and forming a retainer for the edges of the exterior casing, an inner elastic casing its edges adapted to rest upon the exterior of the peripheral band and an inner inflatable air-tube within said inner casing.

9. In combination with a felly having a periphery of greater width than the adjacent portion, an elastic tire, a part thereof seated upon said broader peripheral portion of the felly, and having edges containing looped fabric extending radially and laterally inward under, and adapted to be engaged by, the overhanging peripheral portion of the felly, laterally-detachable flanges secured against the sides of the felly to retain the edges of the tire laterally in position, said flanges extending radially and laterally beyond the periphery of the felly and further forming a lateral support for the base of the tire.

10. In combination with a felly having a periphery of greater width than the adjacent portion, an elastic tire partially seated and supported upon said relatively broader peripheral portion of the felly and having enlarged edges integral with and embodying in common strips of fabric the side walls of said tire extending inward under, and adapted to be engaged by, the overhanging peripheral portion of the felly, laterally-detachable flanges circumferentially continuous secured against the sides of the felly to retain the edges of the tire laterally in position, said flanges extending laterally and radially beyond the periphery of the felly further forming a support for the base portion of the tire.

11. A felly including a peripheral band of a width greater than the adjacent portion of the felly, an exterior casing formed with reinforced edges adapted to be engaged by the overhanging portion of the band and laterally-detachable metallic flanges adapted to be secured against the sides of the felly to retain the reinforced edges in proper position with relation to the band, said flanges forming a support for the tire.

12. In combination, an inner air-tube surrounded by and inclosed within a resilient cushion, a felly including a peripheral band supporting said cushion, an outer envelop inclosing the cushion and tube and provided with enlarged ends underlying the peripheral band, and supporting-flanges adjacent to the felly adapted to prevent lateral displacement of the ends of the envelop and serve as a support for the tire.

13. A felly, a peripheral band greater in width than the adjacent portion of the felly, a tire comprising an inner air-tube, a peripherally-divided cushion, an outer envelop inclosing the cushion and tube, and flanges secured to opposite sides of the felly forming a support for the tire and coöperating with the peripheral band to hold the outer envelop against displacement.

14. In combination, a felly, a peripheral band greater in width than the adjacent portion of the felly, a resilient cushion provided with inexpansible bands supported upon said peripheral band and inclosing an air-tube, an outer envelop conforming to the outline of the cushion and provided with enlarged ends adapted to underlie the peripheral band, and flanges secured to the sides of the felly having parallel portions coöperating with the peripheral band to secure the ends of the envelop, and having outwardly-extending portions forming a seat for the overhanging portions of the tire.

15. In combination in a separable tire, an outer removable envelop, an inner casing of resilient material parted along its inner side, a continuous air-tube located within said cushion, inexpansible bands located within and adjacent to the inner edges of the cushion, a felly including a peripheral flange, the latter greater in width than the adjacent portion of the felly and serving as a support for the cushion, and side flanges applied to the sides of the felly and having a portion adapted to prevent movement of the edges of the envelop, and a second portion adapted to support and form a seat for the sides of the tire.

Signed by me at New York, N. Y., this 30th day of June, 1899.

HENRY G. FISKE.

Witnesses:
    FRANKLAND JANNUS,
    J. S. DE SELDING.